United States Patent [19]

Kurkowski

[11] Patent Number: 5,087,057
[45] Date of Patent: Feb. 11, 1992

[54] HELICAL CUT SEAL

[76] Inventor: Ronald C. Kurkowski, 22487 Bell Ct., Farmington Hills, Mich. 48024

[21] Appl. No.: 467,448

[22] Filed: Jan. 19, 1990

[51] Int. Cl.⁵ .............................. F16J 9/12; F16J 9/00; F16J 9/28
[52] U.S. Cl. .................................. 277/222; 277/216; 277/DIG. 6
[58] Field of Search ............... 277/222, 221, 220, 216, 277/DIG. 6

[56] References Cited

U.S. PATENT DOCUMENTS

| 164,444 | 6/1875 | Grilley | 277/220 X |
| 1,702,294 | 2/1929 | DuBois | 277/222 X |
| 3,455,565 | 7/1969 | Jepsen | 277/222 X |
| 3,588,125 | 6/1971 | Mastromatteo | 277/222 X |
| 3,655,208 | 4/1972 | Walker | 277/221 |

FOREIGN PATENT DOCUMENTS

1212514  3/1960  France .................................. 277/222

Primary Examiner—Allan N. Shoap
Attorney, Agent, or Firm—Dykema Gossett

[57] ABSTRACT

A ring seal has a radial cut, so that the ring seal may be transversely installed over a coaxial element. The cut extends radially and circumferentially to provide cut surfaces that overlap in intimate contact and maintain intimate contact to inhibit leakage between the cut surfaces when the ring seal radially expands. The cut surfaces are helicoid, each characterized by a radial generatrix that is constantly perpendicular to the axis of the seal. A method and apparatus are disclosed for making a ring seal having helical cut surfaces.

1 Claim, 7 Drawing Sheets

HELICAL CUT SEAL

FIELD OF THE INVENTION

The present invention relates to a ring seal having a radial cut, so that the ring seal may be transversely installed over a coaxial element. More particularly, the invention relates to a ring seal having a radial cut that provides matching surfaces which maintain intimate contact to stem leakage through the cut, especially when the ring seal radially expands. Still more particularly, the present invention relates to a ring seal having a cut extending radially and circumferentially provide cut surfaces that overlap in intimate contact and maintain intimate contact to inhibit leakage between the cut surfaces when the ring seal radially expands. Even more particularly, the present invention relates to a ring seal having a helical cut for transversely installing the seal over a coaxial element, the helical cut providing surfaces that intimately contact one another to seal against leakage even when the ring seal radially expands.

The invention also relates to a method and apparatus for making a ring seal of the type just described.

BACKGROUND OF THE INVENTION

Those of ordinary skill in the art relating to fluid control systems, for example automobile automatic transmission systems, know that ring seals are used to prevent leakage around a cylindrically shaped element coaxially mounted in a cylindrical chamber. In the example of an automobile automatic transmission, ring seals are mounted coaxially on piston heads and around piston shafts to prevent leakage of oil in the space respectively between the piston head and the cylindrical chamber in which it is mounted and between the shaft and the cylindrical wall of the opening through which the shaft extends.

The term "ring seal" is used herein generically to describe any seal that is circumferential, that has an inner and an outer diameter, that has a width between the inner and outer diameters, and that has an axial depth. Such ring seals are made of a variety of materials. A material is chosen to allow a seal to radially expand and withstand the temperature of a particular fluid in a cylinder, to slide easily while in intimate contact with the wall of the cylinder, and to endure the mechanical and chemical assault of the pressurized fluid. Particularly adapted to these ends for use in automatic transmissions are polytetrafluoroethylene, the material being known under the trademark "TEFLON."

No matter how durable a ring seal made of a particular material is for a particular use, the seal is susceptible to wear and failure and must be replaced from time to time. To avoid an unnecessary breakdown of the mechanical parts when replacing a ring seal (or even to facilitate the initial assembly of the mechanical parts), it is advantageous to have a seal separate along its circumference, so that the ring seal may be transversely placed into position over the element on which it is to be coaxially mounted.

Figure 1:
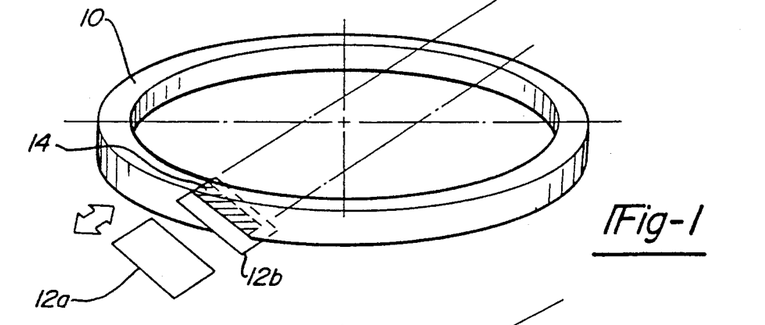
FIG. 1 is a schematic perspective of a ring seal cut by a first prior art method.

A conventional means of fabricating ring seals that separate on their circumferences is to cut ring seal that are first manufactured with continuous circumferences. Two methods are employed. A first method is schematically illustrated in FIG. 1 of the drawings. The ring seal 10, before it is cut is circumferentially continuous. Blade 12, shown in two positions as blade 12a and blade 12b, is plunged directly into the seal 10. Blade 12a represents blade 12 before it is plunged into seal 10 or after it is withdrawn from seal 10. Blade 12b represents the blade after it is plunged into seal 10 but not yet withdrawn. Cutting the seal thus provides two cut surfaces, both of which are represented by the cutting plane 14 which is cross-hatched in the drawing. These surfaces are chamfered, mirror images of one another. The surfaces may be separated, owing to the preferably flexibility of the ring seal 10, so that ring seal 10 may be opened and transversely mounted onto a coaxial cylindrical element. The chamfered ends are placed into intimate contact with one another to keep the integrity of the seal around the complete circumference. Theoretically the matching surfaces 14 of the cut ends are in intimate contact when the seal is in place on or around the coaxial element. But contrary to the theory, the contact between the two surfaces is not as intimate as would be preferred. With use of the plunging method, the cutting tool 12a, 12b compresses the material ahead of it and puts the material still further ahead in tension. The material in tension tears as the cutting tool breaks through. The tearing does not provide for a uniform cut across the thickness of the seal 10, that is, along surfaces 14. At best, surfaces 14 are most intimate when the cut ends are perfectly aligned. The slightest misalignment, which is bound to take place under the dynamic conditions that the seal is subjected to, reduces the intimacy the contact and thus provides a path for leakage of a fluid under pressure.

Figures 2, 3:
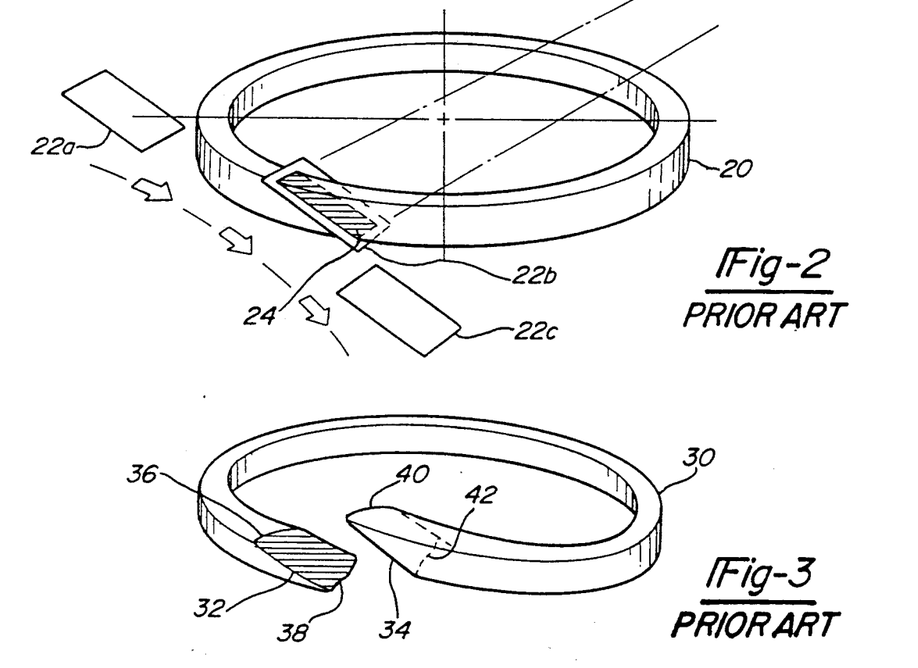
FIG. 2 is a schematic perspective of a ring seal cut by another method of the prior art.
FIG. 3 depicts one of the disadvantages of using the methods illustrated in FIGS. 1 and 2.

The second method involves a slicing dynamic, as shown in FIG. 2. A ring seal, shown generally at 20, also has a continuous circumference before it is cut by cutting tool 22a, 22b, 22c, as shown in three positions during cutting. The cutting motion begins at the position shown by blade 22a as it enters into the seal 20. The seal is cut through to provide chamfered surfaces 24, also shown by cross hatching, and the cutting tool 22c shows the position it would occupy at it emerges from the seal 20.

While slicing does not compress the material of ring seal 20, it does no eliminate tearing. Moreover, a phenomenon associated with tearing both with the plunging method and the slicing method exasperates the requirement of exact alignment of the cutting surfaces in order to maintain the integrity of the seal 20.

As may be seen in FIG. 3, there is a ring seal 30 cut by either of the just described methods. Ring seal 30 has two cut surfaces 32 and 34, which result from the cutting tool cutting through ring seal 30. The edges of the cut surfaces 32 and 34 do not project along the radius of seal 30, but curve away from the axis of the seal so as to result in scalloped edges 36, 38, 40 and 42. The phenomenon of the scalloped edges is associated with all cut lines making up the cut surfaces 32, 34. Thus, a slight misalignment of the two cut surfaces 32 and 34 would cause relative angular displacements of the cut lines making up cut surfaces 32 and 34 so that the surfaces 32 and 34 are not in intimate contact.

In FIG. 1, as blade 12a contacts seal 10, as a point of tendency with respect to the outer diameter of seal 10, and then is plunged into the seal, the cut surfaces 14 expand upwardly and downwardly along the chamfered surface as the cutting edge of the blade becomes an increasing cord within the outer diameter until blade 12b emerges from the inner diameter of seal 10. Accordingly the scalloped edge of the cutting surfaces is duplicated top and bottom with plunge slice. In FIG. 2, blade 22a traverses a different path with respect to its entering both top and bottom. The slicing of seal 20 is in an arc which causes the blade to move in an arc. Thus, the tearing occurs over the arc which explains an exaggerated scalloped edge that is different both top and bottom.

When the cut surfaces are separated so that the seal may be placed over a coaxial part, the seal is likely not to be situated so that it attains its original diameter as it straddles apart. Even if it attains its original diameter when placed in its work position, it will move and expand under the dynamics of its environment. Accordingly, the cut surfaces will ramp upon one another. But as the cut surfaces only match when returned to their original position, there develops a passage for leakage.

SUMMARY OF THE INVENTION

I have discovered a novel and a nonobvious method of cutting the seal so that there is a uniformity in matching the cut surfaces under conditions of expansion or retraction as one surface ramps upon the other. By this method, I have produced a novel cut seal. In order to produce such a seal I have invented a novel apparatus for cutting the seal. Instead of plunging towards the axis of the seal from outside its outer diameter or slicing from top to bottom of the seal from outside its diameter, I cut in the manner of the wrapping of the seal as it expands or contacts when placed in postion on a coaxial part under the dynamics of its environment.

By my method, I start to cut from inside the seal and move outwardly. The blade, according to my method, is disposed at an angle, preferably 10 degrees, with respect to the plane on which the seal rests. The cutting edge of the blade always passes through the axis of the seal during cutting and is always perpendicular to the axis. The blade revolves as a radius of the seal and drops as it cuts.

The machine that utilizes the method is disposed above a conveying path on which is supplied in timed fashion ring seals. The machine has an actuator that may be connected to an oscillating device timed with the conveyor conveying the ring seals. The oscillating device reciprocates the oscillator in a rotation of about 120 degrees. The actuator carries an actuator shaft that is connected to a slide housing within the machine. The actuator shaft while traversing the 120 degree path of the actuator oscillates the slide housing. A cam follower connected to the slide housing is disposed against a cam surface associated with a fixed support guide that is coaxial the actuator. The cam surface cams the cam follower and concomitantly the actuator shaft and slide housing downwardly from the actuator and with respect to the fixed support guide.

Within a bore of the support guide is disposed a guide shaft which may move upwardly and downwardly along the axis of the support shaft. When the slide housing is driven downwardly by the cam surface it concomitantly drives downwardly a slide plate assembly connected to the slide housing. The slide plate assembly is connected to the guide shaft so as to move the guide shaft downwardly as it moves downwardly.

The slide plate assembly includes a top plate and a bottom plate, the bottom plate moves relative to the top plate to an fro, perpendicularly to the axis of the guide shaft. The top plate and the bottom plate of the assembly have no rotational movement with respect to one another and rotate together with the rotation of the slide housing. Likewise, the top plate and bottom plate of the slide assembly travel upwardly and downwardly with the slide housing. Attached to the bottom of the bottom plate is a blade assembly housing and presenting a blade.

At the bottom of the guide shaft is a locator clamp which moves with the guide shaft. As a ring seal is disposed beneath the locator clamp and guide shaft as the guide shaft comes downwardly the ring seal is trapped within the locator clamp. The blade is disposed above the ring seal and begins to come downwardly while rotating with the slide housing. After the actuator, slide housing, and blade rotate approximately 73 degrees, the guide shaft ceases its downward motion. The blade, however, continues its downward motion with the slide housing.

At approximately 82 degrees of rotation, the bottom plate of the slide assembly slides relative to the top plate of the slide assembly and to the axis of the machine. This is a result of a camming surface followed by a cam roll bearing which is fixed to the slide plate assembly. The cam surface allows the bottom plate to move outwardly under the force of a plunger. Outward motion of the slide bottom plate causes the blade to concomitantly move radially outwardly as it cuts down into the seal. The blade is always disposed at a 10 degree angle with respect to the top of the seal.

Thus, the combination of the downward camming while radial traverse of the blade causes every point of its cutting edge to follow a helical path. The helical path provides a more consistent and uniform cut that provides a sealing surface between the cut surfaces.

BRIEF DESCRIPTION OF THE DRAWINGS

The objects and features of the present invention will become apparent with a detailed account of the invention and reference to the accompanying drawings in which:

FIGS. 5a-5c depict a helical cut using the method depicted in FIG. 4, wherein

DETAILED DESCRIPTION OF THE PREFERRED EMBODIMENT

Figure 4:
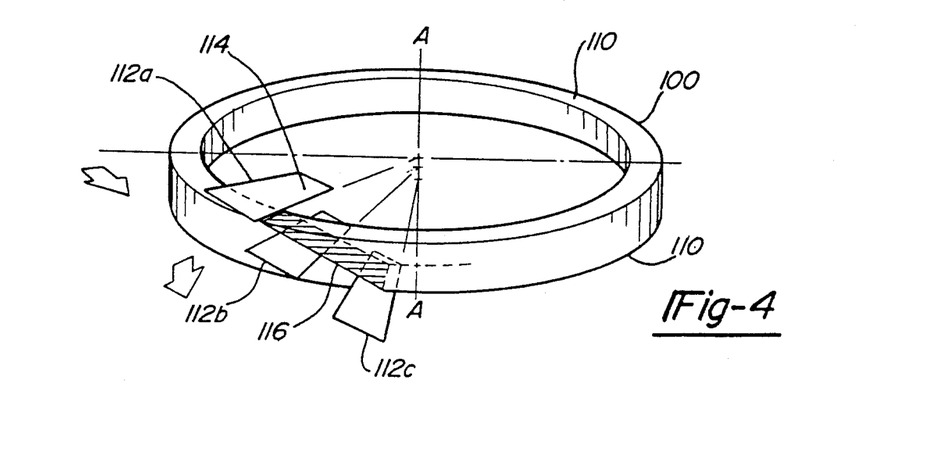
FIG. 4 depicts the method of cutting a ring seal according to the present invention.

Reference will be made to FIGS. 4-10 in describing the ring seal, method and apparatus of the preferred embodiment, in which like parts are represented by like numerals. In FIG. 4, a ring seal 100 according to the preferred embodiment is shown in a diagrammatic illustration of how the ring seal 100 is manufactured.

According to the manufacturer illustrated in FIG. 4, the ring seal 100 is preferably made of polytetrafluoroethylene or "TEFLON". The ring seal 100 is structured, before manufacture according to the invention, with a continuous circumference. Ring seal 100 has generally parallel sides 110, the sides having a width between an outer diameter and an inner diameter. Side 110 is generally flat. Ring seal 100 has an axis A—A.

Figure 5A:
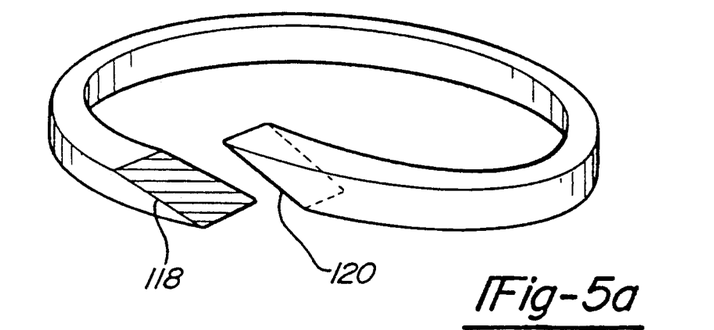
FIG. 5a depicts the advantageous result of using the method.
Figure 5B:
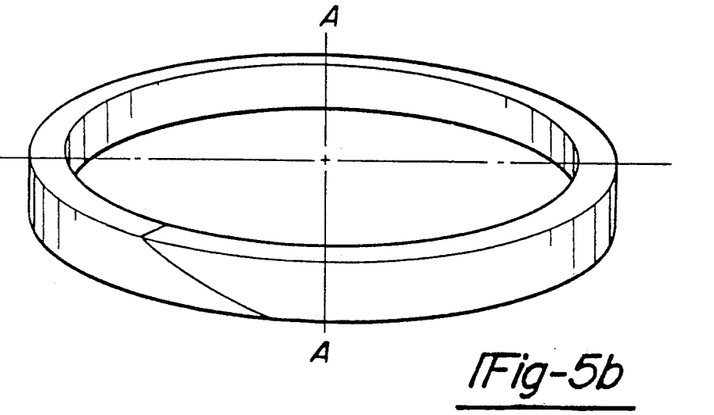
FIG. 5b depicts a perspective view of a ring seal having a helical cutline.
Figure 5C:
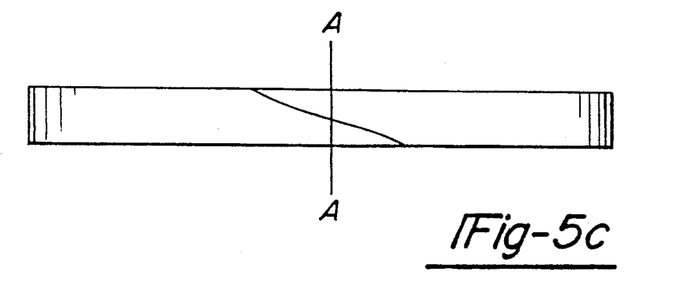
FIG. 5c depicts a side elevation of the helical seal shown in FIG. 5b.

According to the invention, ring seal 100 has been cut generally along cutting plane 116. As can be seen in FIGS. 5b and 5c, plane 116 does not project as a straight line upon the axial side of ring seal 100, as the cut line follows a helical path that is the projection of mating helicoid surfaces as will be explained below. Furthermore, according to the invention, the cutting plane 116 is smooth and generally constant with parallel sealing surfaces 118 and 120, both of which are shown in FIG. 5a.

According to another aspect of the invention, ring seal 100 has been cut by a blade 112, which is shown in three positions 112a, 112b and 112c. Blade 112 is generally flat and has a leading, cutting edge 114. When cutting edge 114 is presented toward ring seal 100, preferably there is an angle of 10 degrees between the general plane of blade 112 and the side 110, so as to present the cutting edge 114 generally downwardly into ring seal 100. A novel cut seal is produced when blade 112 cuts seal 100 from the inner diameter of seal 100 and moves outwardly toward the outer diameter, instead of blade 112 plunging towards the axis of seal 100 from outside its outer diameter or slicing from top side 110 of seal 100 to bottom side 100 of seal 100. The cut is in the manner of the wrapping of seal 100 as it expands or contracts when placed in position on a coaxial part under the dynamics of its environment.

Blade 112 is disposed at an angle (preferably 10 degrees) with respect to the plane on which seal 100 rests. The cutting edge 114 of blade 112 always projects through the axis A—A of seal 100 during cutting. Blade edge 114 is always perpendicular to axis A—A. Blade 112 revolves as a radius of seal 114 and drops as it cuts.

Generally, cutting edge 114 is parallel to side 110 and perpendicular to axis A—A. The cutting edge 114 of blade 112 maintains its orientation as parallel to side 110 while blade 112 maintains its 10 degree orientation with respect to side 110, throughout the operation of blade 112 cutting through ring seal 100 along plane 116.

Surfaces 118 and 120, shown in FIG. 5, are formed by the cut. The surfaces 118 and 120 are mating surfaces extending between the inner and outer diameters of the ring seal 100 and across its depth perpendicular to side 110. These surfaces 118 and 120 are each a helicoid characterized by a radial generatrix, following the edge 114 of blade 112, that is constantly perpendicular to the axis A—A of ring seal 100 over a sector of ring seal 100 between its inner and outer diameters. The sector is bounded by the radius of ring seal 100 aligned with blade edge 114, as blade edge 114 contacts side 110 of ring seal 100 to begin cutting ring seal 110, and the radius of ring seal 100 aligned with blade edge 114 as blade edge 114 cuts through ring seal 100 on side 110 of ring seal 100 opposite the side 110 that blade edge 114 beings cutting ring seal 100.

A machine employing the method just described is shown in FIGS. 6-9. The machine, generally referred to by numeral 200, is cantilevered from a mounting support 210. Mounting support 210 has welded parts, including a beam 212, a column support 214, and a flange 216. Mounting plate 216 is bolted to a work table 218 or the like.

Figure 6:
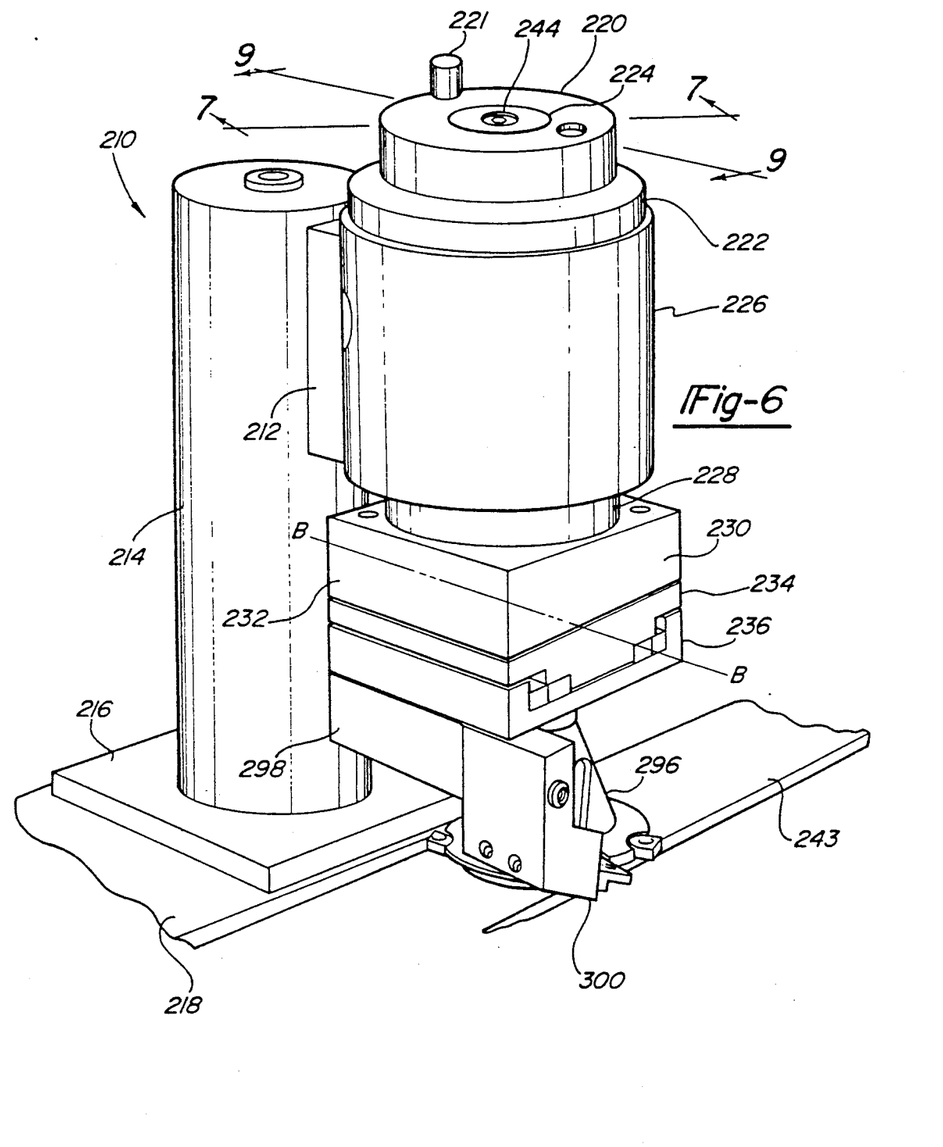
FIG. 6 is a perspective view of an apparatus in accordance with the present invention.

Referring now in particular to FIG. 6, the machine 200 has an actuator 220 which is seated atop machine 200 on a support guide 222 and retained there by a retainer 224, which is recessed within actuator 220. Support guide 222 and retainer 224 are fixedly connected via support guide housing 226 by structure to be later explained with reference to FIGS. 7 and 9. Support guide housing 226, which has an access port 227 having a purpose which is to be explained later, is fixedly attached to mounting support 210. Preferably, support guide housing 226 and mounting support 210 are a weldment. The structure reveraled in FIGS. 7 and 9 will also show that actuator 220 rotates relative to support guide housing 226.

Actuator 220 is actuated by an oscillating device connected to actuator 220, for example by the oscillating device clamping to a pin 221. Those of ordinary skill in the art of machine design have a range of choices of such devices and means of connecting such devices to actuator 220 with the object of rotating the actuator in the manner described. A slide housing 228 is rotatable with the actuator 220. Rotation of slide housing 228 rotates an axis B—B of a box base portion 229 of slide housing 228. Shown in FIG. 6 are a first side 230 and a second side 232 of the box base portion 229 of slide housing 228.

The box base portion of slide housing 228 is fixely attached to a slide top plate 234, so that slide top plate 234 is also rotatable with actuator 220 and slide housing 228. Depending from slide top plate 234 and rotatable therewith is a slide bottom plate 236. Slide bottom plate 236 is slidable relative to slide top plate 234 in a direction parallel to second side 232 and perpendicular to first side 232 of the portion of slide housing 228 shown in FIG. 6.

Depending from slide bottom plate 236 is a mounting block 298. Bolted to mounting block 298 is a blade adapter 300. Depending from machine 200 by structure not shown in this view is a locator clamp 296. Locator clamp 296 moves up and down along the axis of machine 200 as the axis of machine 200 is centered within support guide housing 226. Locator clamp 296, when lowered, lcoates a ring seal, for example ring seal 100 to FIG. 4, which is conveyed to its work station beneath locator clamp 296 and machine 200 by a conveyor 243. Conveyor 243 may be a conventional conveyor known to those of ordinary skill in the art of machine design and is sychronized to the oscillation of actuator 220, for example by the same oscillating device as has been said to be known by those of ordinary skill in the art of machine design.

Figure 7:
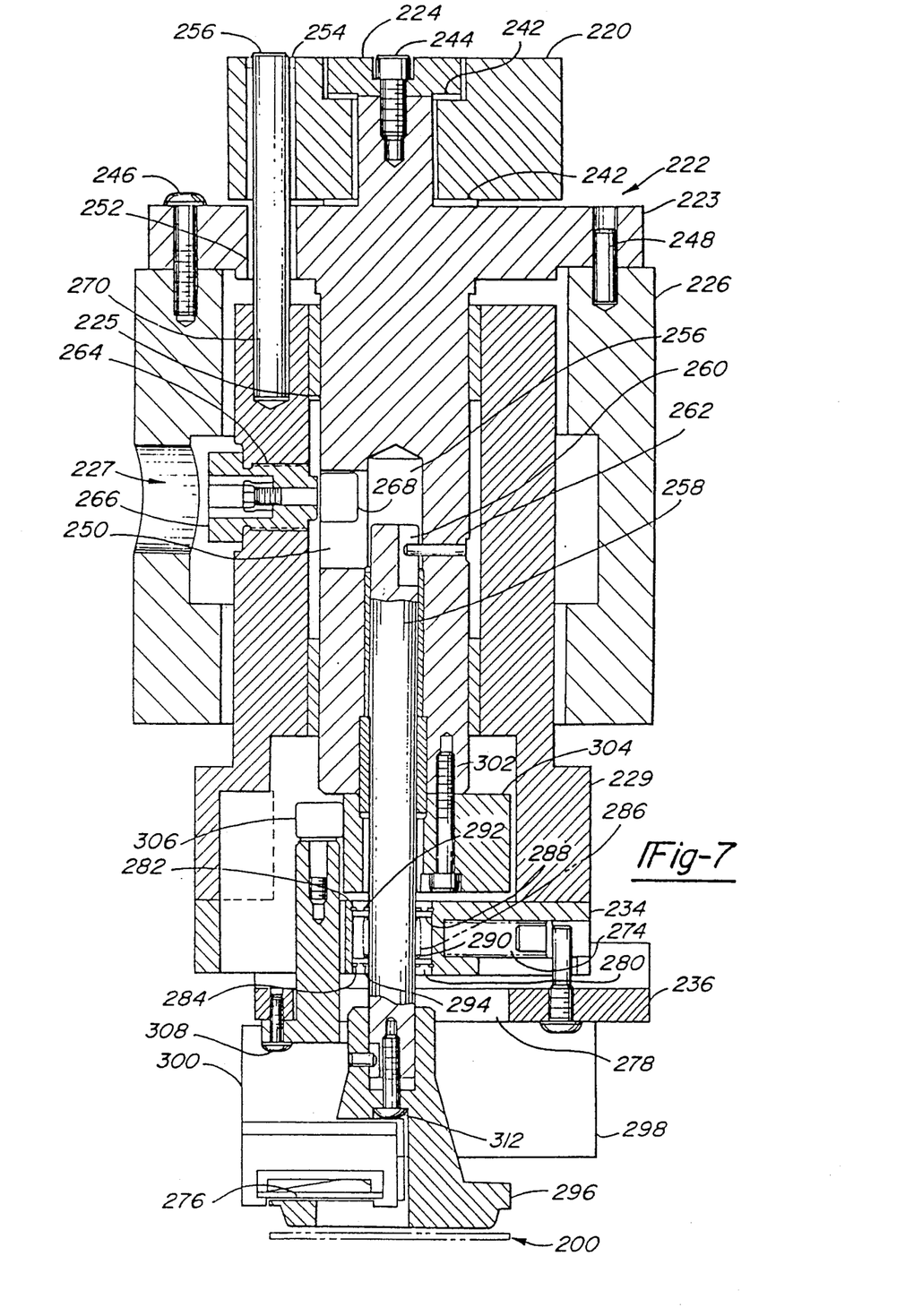
FIG. 7 is a cross-sectional view in the direction of arrows 7—7 of FIG. 6.
Figure 8:
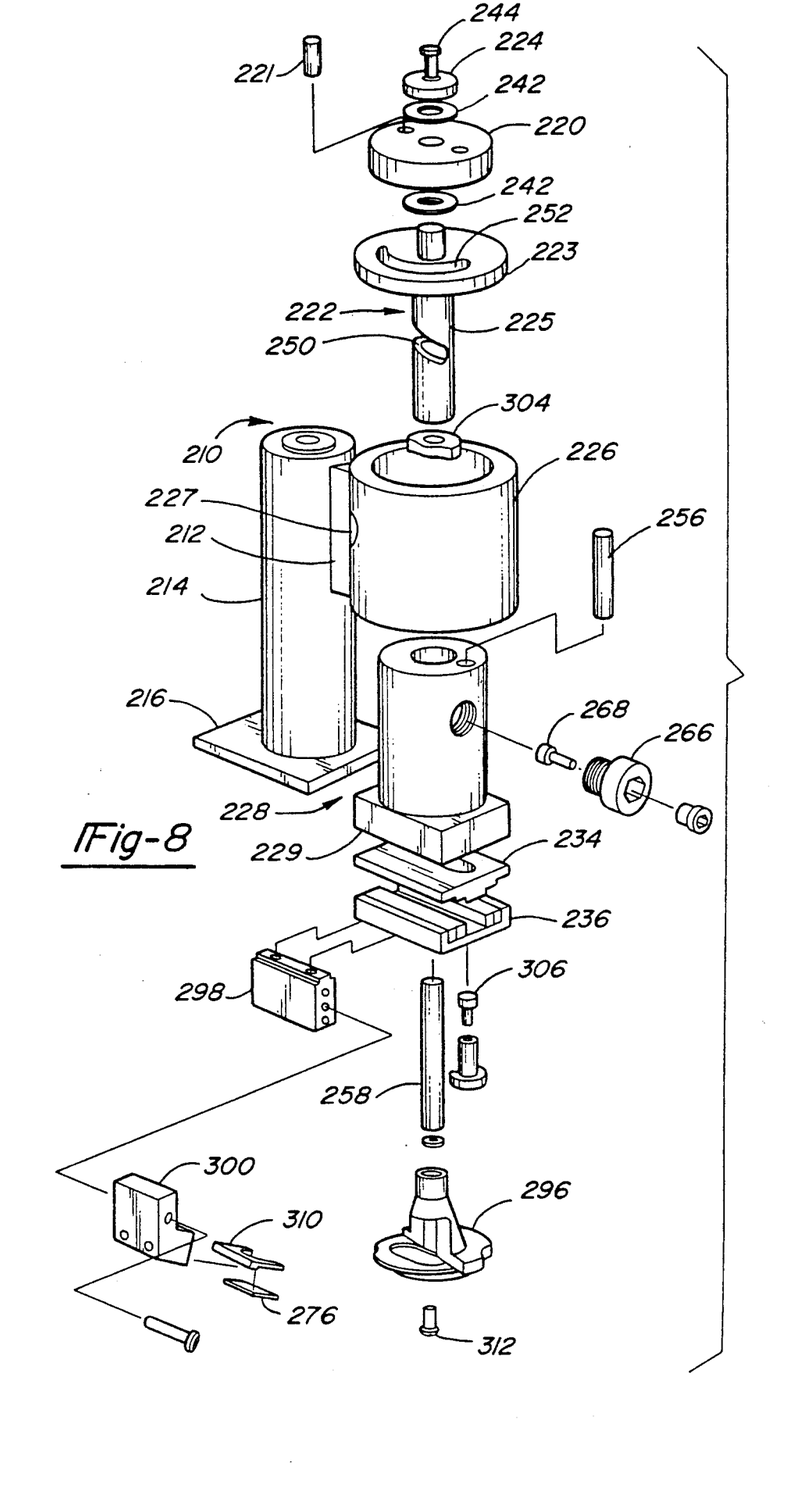
FIG. 8 is an exploded view of the apparatus shown in FIGS. 7-9.
Figure 9:
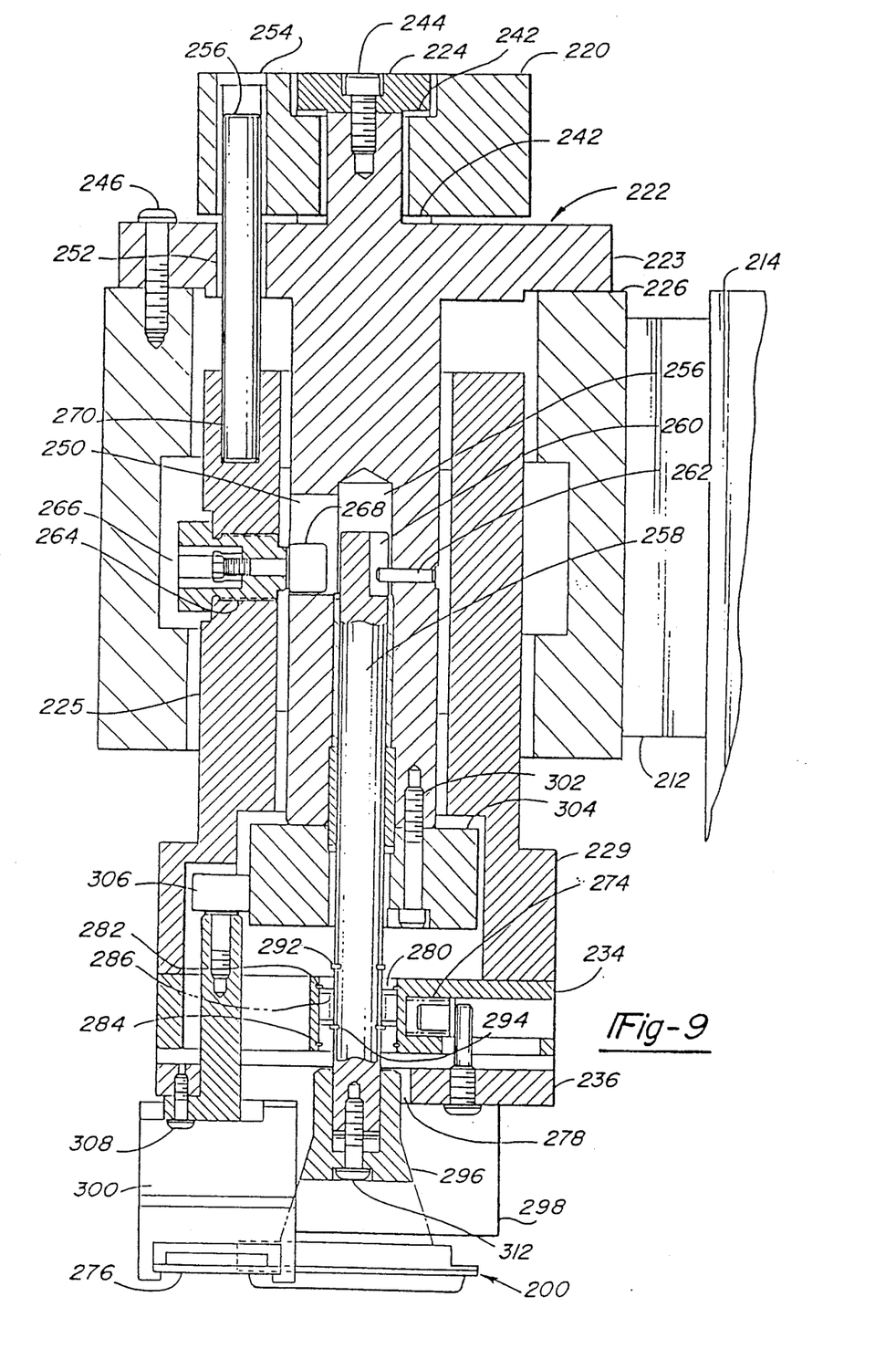
FIG. 9 is a cross-sectional view in the direction of arrows 9—9 of FIG. 6.

Referring now to FIGS. 7-9, where the same numerals refer to the same respective parts of machine 200, actuator 220 is seen to be rotatably mounted on support guide 222. Thrust washers 242 separate the rotatable actuator 220 from the fixed retainer 224 and support guide 222. Retainer 224 is mounted on support guide 222 by means such as socket head screw 244.

Support guide 222 includes a support guide flange portion 223 and a support guide column portion 225. Support guide column portion 225 extends generally coaxially within support guide housing 226. Support guide 222 is supported by support guide housing 226 and the flange portion 223 of support guide 222 is fixedly attached to support guide housing 226 by button head screws 246. Alignment of support guide 222 within support guide housing 226 is important because the column portion 225 of support guide 222 includes a helical cam groove 250 that must be accessible through access port 227 of support guide housing 226. As seen in FIG. 8, an arcuate slot 252 of approximately 120 degress, is generally coaxially disposed in the flange portion 223. An opening 254 in the actuator aligns with arcuate slot 252.

A bore 256 extends along the axis of support guide 222. A guide shaft 258 is received therein. Although guide shaft 258 is free to move coaxially within bore 256, guide shaft 258 is not free to rotate as guide shaft 258 has a notch 260 at its upper end into which a retaining pin 262 extends. Retaining pin 262, which is anchored to the column portion 225 of support guide 222, also serves to limit the coaxial travel of guide shaft 258 so that it does not bottom out.

It can be seen in FIGS. 6-9 that slide housing 228 is coaxially disposed about support guide 222, below the flange portion 223 of support guide 222. A threaded opening 264 extends through slide housing 228. Threaded opening 264 threadably receives a bearing adapter 266 which serves to position a cam follower bearing 268 which bearing adapter 266 holds through an opening in bearing adapter 266 accommodating a nut and bolt arrangement. Slide housing 228 has a cylindrical cavity disposed in it where slide housing 228 will align with arcuate slot 252 and actuator opening 294, while threaded opening 264 aligns with access port 227.

Cavity 270 has a diameter approximately the diameter of an actuator shaft 256 which it receives, preferably tightly. Arcuate slot 252 and actuator opening 227 are also dimensioned to accommodate actuator shaft 256, although with greater tolerance. Actuator shaft 256 accordingly extends through actuator opening 254 and is seated in a cylindrical cavity 270 of slide housing 228. As actuator 220 is reciprocately rotated within an angle of rotation of approximately 120 degrees, actuator shaft 256 responsively traverses the arcuate path of actuator opening 252, and slide housing 228 responds to the reciprocation of actuator shaft 256 by reciprocating with actuator 220.

Thus support guide housing 226 and support guide 222 are fixed against motion and actuator 220 and slide housing 228 rotate together relative to support guide housing 226 and support guide 222. As further relative motion between these parts slide housing 228 moves axially of support guide 222 as cam follower bearing 268 is cammed along the helical path of helical cam groove 250. Accordingly, rotation of actuator 220 in one rotational direction causes slide housing 228 to rotate, which in turn causes cam follower bearing 268 to follow the helical path downwardly, driving the rotating slide housing 228 downwardly. Rotation of actuator 220 in the other rotational direction causes cam follower bearing 268 to follow the helical path upwardly driving slide housing 228 upwardly.

The box base portion 229 of slide housing 228 is fixedly attached to slide top plate 234. Accordingly, slide top plate 234 rotates with and traverses upwardly and downward with slide housing 228.

Slide top plate 234 is a part of a conventional slide assembly known to those of ordinary skill in the art of machine design. It is well known to those of such skill that such a slide bottom plate 236 slidably depends from a track fixedly attached to slide top plate 234. A compression spring 274 holds slide bottom plate 236 outwardly from slide top plate 234 as shown in FIG. 7. This outward position relative to slide top plate 234, is to be designated "the returned position." When slide bottom plate 236 is congruent with slide top plate 234, compression spring 274 is compressed. This position will be designated "the extended position." It is to be understood that these positions do not relate to whether the slide bottom plate is "extended" or "returned". Rather, these designations relate to the position of a cutting blade 276 as will be explained.

Slide bottom plate 236 has an alongate opening 278 through which guide shaft 258 extends, whether slide bottom plate 236 is in the returned position or in the extended position. Slide top plate 234 has an opening 280 through which guide shaft 258 extends into bore 256. Retaining rings 282 and 284 trap a guide shaft compression spring 286 between retaining rings 282 and 284 and hold the spring within the opening 280 of slide top plate 234. A washed 288 is disposed between retaining ring 282 and the top end of compression spring 286, and a washer 290 is disposed between the retaining ring bottom end of compression spring 286. Retaining rings 292 and 294 trap compression spring 286 between fixed positions on guide shaft 258. Thus, compression of compression spring 286 must take place between the datum points set by retaining rings 282, 284, 292 and 294.

Compression spring 286 has a sufficient stiffness to force guide shaft 258 upwardly or downwardly as slide bottom plate 236, slide top plate 234, and slide housing 228 move upwardly or downwardly. Compression spring 286 has a sufficient resilience to allow relative motion between guide shaft 258 and slide bottom plate 236, slide top plate 234, and slide housing 228 when guide shaft 258 is resisted in its downward motion and slide bottom plate 236, slide top plate 234 continue to move downwardly. In this connection, guide shaft 258 has on its bottom end, the end opposite its end disposed in bore 256, a locator clamp 296. As guide shaft 258 is not free to rotate because of retaining pin 262, so is locator clamp 296 restrained from rotating. Locator clamp 296 functions to clamp a seal 200 when conveyed beneath locator clamp 296 to hold seal 200 in place for cutting seal 200. In further connection, fixedly depending from slide bottom plate 236 is a mounting block 298 to which is attached a blade adapter 300. Blade adapter 300 accordingly moves with slide bottom plate 236, rotationally and upwardly or downwardly. As locator clamp 296 clamps seal 200 which resists downward movement of locator clamp 296 and guide shaft 258, blade adapter 300 continues to move downwardly with the assembly of mounting block 298, slide bottom plate 236, slide top plate 234, and slide housing 228.

One further degree of motion for blade adapter 300 should be explained before its function with the cutting operation of seal 200 is discussed. Bolted to the bottom of support guide 222 by bolt 302 is a cam 304. Cam 304 is accordingly fixed from rotational or axial movement. Cam 304 has a cam surface, shown in FIG. 10, that, after sweeping at a generally constant, relatively short radius, sweeps outwardly at an increasing radius and then quickly drops back to the short radius. This facilitates a cam follower to move at a constant radius and then outwardly from the axis of machine 200. The cam follower is cam roll bearing 306, which is bloted to slide bottom plate 236 by bolt 308. As slide bottom plate rotates with slide housing 228, cam roll bearing 306 moves about the axis of machine 200, which is the axis of guide shaft 258, at a constant radius. At this constant radius, slide bottom plate 236 is in the retracted position shown in FIG. 7. Then, as the radius of cam 304 increases, cam roll bearing 306 moves radially outwardly forcing slide bottom plate 236 against compression spring 274 to the extended position. When can roll bearing 306 drops back with the radius of cam 304, slide bottom plate 236 is forced by compression spring 274 into the retracted position.

Blade adapter 300 holds blade 276 at an angle of approximately 10 degrees from the flat side of the seal, which is the horizontal as viewed in FIGS. 7 and 9. A spacer 310 clamps blade 276 in place. This angle is relatively conventional for cut surfaces, allowing for a maximal sealing place while keeping the structural integrity of the seal 200. Blade adapter 300 also holds blade 276 so that its cutting edge projects through the axis of machine 200, which is the axis of rotational movement of blade 276. Finally, blade adapter 300 holds blade 276 so that its cutting edge is parallel to the horizontal plane that is the flat side of seal 200. This plane is substantially parallel to the plane of conveyor 243.

Locator clamp 296 is structurally configured to permit blade 276 to sweep a helical path as it cuts without interference. It is also configured to center itself within the inner diameter of seal 200. Clamp 296 is attached to guide shaft 258 by bolt 312.

Figure 10:
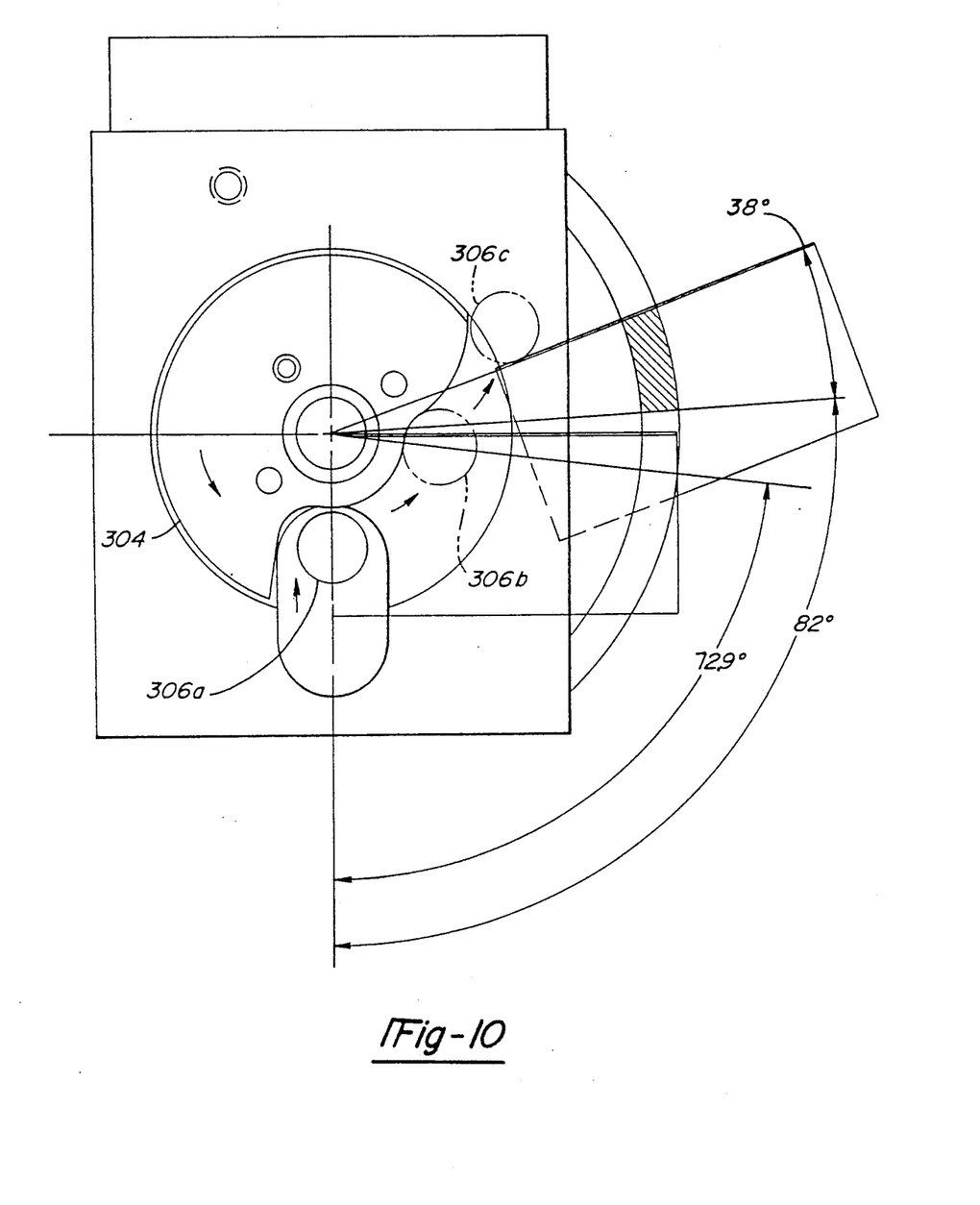
FIG. 10 is a depiction of the rotation of a blade used in the apparatus shown in FIGS. 7-9.

With reference to FIGS. 7, 9 and 10, the method and apparatus according to the present invention can now be appreciated. A seal 200 is conveyed by conveyor 243 to its work station positioned under locator clamp 296. The movement of conveyor 243 is synchronized with the downward travel of clamp locator 296. The downward travel of clamp 296 is initiated by the rotation of actuator 220 with the machine being in generally the overall posture of the machine 200 as shown in FIG. 7. In particular, cam roller bearing 306 is as shown in position of cam roller bearing 306a of FIG. 10. The rotation of actuator 220 causes slide housing 228 to rotate about support guide 222. This rotation is translated to the rotation of blade 296 as has been described. Concomitantly, slide housing 228 is cammed downwardly pulling actuator shaft 256 downwardly in to opening 254.

Downward movement of slide housing 228 translates to a downward movement of rotating blade 276, causing each point on its cutting edge of follow a helical path. In particular, when roller bearing 304 reaches the position of roller bearing 306b in FIG. 10, which is approximately 72.9 degrees of rotation for a seal having a depth of 0.0625 inches, locator clamp 296 clamps down on seal 200 to hold it in place. Then cam roller bearing 306 begins to sweep outwardly drawing slide bottom plate 236 out to its extended position and causing blade 276 to draw radially outwardly.

At approximately 82 degrees, the blade begins cutting the seal and emerges from the bottom of the seal before roller bearing 304 reaches the position of roller bearing 304c in FIG. 10, which is approximately 120 degrees of rotation.

It should be appreciated that the measured angles of rotation and seal depth by no means limits the invention, but is only representative of the invention by the best mode that I have contemplated of carrying out my invention.

Having fully described an operative embodiment of my invention, I now claim:

1. A ring seal having an axis, an inner diameter about said axis, an outer diameter about said axis, a thickness between said inner and outer diameter, and a depth extending parallel to said axis, said ring seal comprising mating surfaces extending between said diameters and across said depth, said surfaces each being a helicoid characterized by a radial generatrix that is constantly perpendicular to said axis over a sector of said seal between said inner and outer diameters.

* * * * *